Figure 1:
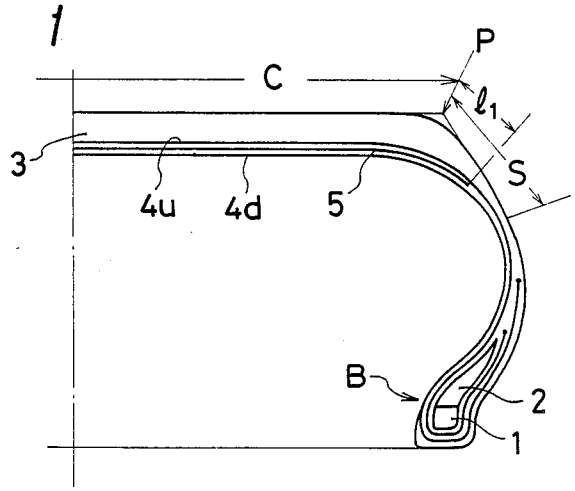

United States Patent [19]

Kobayashi et al.

[11] Patent Number: 4,848,431
[45] Date of Patent: Jul. 18, 1989

[54] PNEUMATIC TIRE FOR HIGH SPEED DRIVING

[75] Inventors: Kenichi Kobayashi; Shinichi Mori, both of Hiratsuka, Japan

[73] Assignee: The Yokohama Rubber Co., Ltd., Tokyo, Japan

[21] Appl. No.: 875,423

[22] Filed: Jun. 17, 1986

[30] Foreign Application Priority Data

Jul. 26, 1985 [JP] Japan ............... 60-163939

[51] Int. Cl.⁴ .................................. B60C 9/10
[52] U.S. Cl. ..................... 152/548; 152/564
[58] Field of Search ............ 152/209 WT, 454, 548, 152/556, 549; 156/564

[56] References Cited

U.S. PATENT DOCUMENTS

| | | | |
|---|---|---|---|
| 3,292,681 | 12/1966 | Travers | 152/532 |
| 3,298,417 | 1/1967 | Keefe, Jr. | 152/556 |
| 3,989,083 | 11/1976 | Chrobak | 152/556 |
| 4,209,050 | 6/1980 | Yoshida et al. | 152/556 |

FOREIGN PATENT DOCUMENTS 0136003  10/1978  Japan ..................... 152/548

Primary Examiner—Michael W. Ball
Attorney, Agent, or Firm—Armstrong, Nikaido, Marmelstein, Kubovcik & Murray

[57] ABSTRACT

A pneumatic tire for high speed driving having a flat ratio of from 0.25 to 0.75, characterized in that the rubber thickness between upper and lower carcass cords is from 120 to 300% of a carcass cord diameter from a crown portion to a shoulder portion.

3 Claims, 1 Drawing Sheet

PNEUMATIC TIRE FOR HIGH SPEED DRIVING

BACKGROUND

This invention relates to a pneumatic tire for high speed driving which has an excellent high speed durability.

Conventional pneumatic tires for high speed driving are flat tires which have at least two carcass layers and in which carcass cords of these carcass layers cross one another between plies at an aspect ratio (a ratio of a tire sectional height measured from a bead to a tire maximum width) ranging from 0.25 to 0.75. The rubber thickness between the upper and lower carcass cords is up to 50% of a carcass cord diameter in order to reduce the tire weight. For this reason, when large stress in a lateral direction acts upon the tires when driving on a high speed circuit, so-called "CBU (Casing Break-UP)" is likely to occur.

SUMMARY

Accordingly, the present invention is directed to provide a pneumatic tire for high speed driving which is increased in the rubber thickness between upper and lower carcass cords and is thereby remarkably improved in the high speed durability without a sacrifice to its driving stability.

In a flat tire of the type wherein at least two carcass layers coming into contact with one another are mounted between a pair of right and left bead portions and the carcass cords of these carcass layers cross one another between plies and whose aspect ratio is from 0.25 to 0.75, the object of the invention described above can be accomplished by a pneumatic tire for high speed driving characterized in that the rubber thickness between the upper and lower carcass cords is from 120% to 300% of a carcass cord diameter from a crown portion to a shoulder portion.

The above and other objects and novel features of the present invention will become more apparent from the following detailed description when taken in conjunction with the accompanying drawings.

THE DRAWINGS

Figure 2:
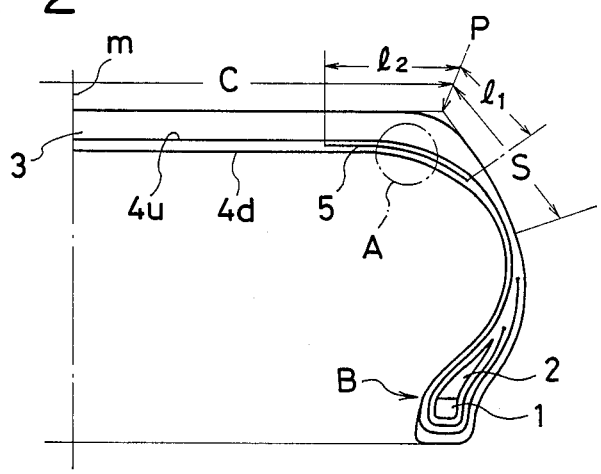
Figure 3:
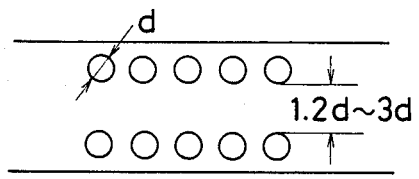

FIGS. 1 and 2 are semi-sectional explanatory views of an example of a pneumatic tire for high speed driving in accordance with the present invention, respectively; and FIG. 3 is an enlarged view of the portion A shown in FIG. 2.

THE PREFERRED EMBODIMENT

In FIGS. 1 and 2, symbols C, S and B represent a crown portion, a shoulder portion and a bead portion, respectively. The flat ratio of the tire shown in these drawings is from 0.25 to 0.75.

A two-layered carcass layer consisting of upper and lower carcass layers $4u$ and $4d$ is shown disposed between a pair of right and left bead portions B, B in the drawings. Bead wires 1 are disposed toroidally at each bead portion B and a bead filler 2 is disposed on the bead wires 1. The upper and lower carcass layers $4u$ and $4d$ are turned up around the bead wires 1 from inside to outside the tire. Reference numeral 3 represents a tread portion.

The carcass cord of the upper carcass layer $4u$ and the carcass cord of the lower carcass layer $4d$, that is, the carcass cords between plies, cross one another.

Chemical fibers such as nylon, polyester and aromatic polyamide fibers and carbon fibers are used as the carcass cord.

The upper and lower carcass cord layers $4u$ and $4d$ are produced by burying the respective carcass cords into coating rubber (cover rubber). The coating rubber preferably has a 100% modulus of from 30 to 70 $kg/cm^2$. If the 100% modulus of the coating rubber is below 30 $kg/cm^2$, the elasticity of the carcass layer will drop and hence, driving stability will drop. If it exceeds 70 $kg/cm^2$, on the other hand, the coating rubber becomes so hard that producibility will drop. In addition, so-called "scorch" or "burn" will occur because the rubber generates heat at the time of coating.

Preferably, the end count of the cords of these carcass layers is from 20 to 65 (parallel) per 50 mm inside the coating rubber in a direction at right angles to the cords (i.e. within the angular range of from 20° to 40° relative to a tire equatorial plane). If it exceeds 65, intrusion of the coating rubber into the cords is inhibited and hence, bonding power will drop. If it is below 20, on the other hand, a reinforcing effect will be insufficient.

As shown in FIG. 3 which is an enlarged view of the portion A of FIG. 2, the rubber thickness between the carcass cords of the upper carcass layer $4u$ and the carcass cords of the lower carcass layer $4d$ is set to be from 120 to 300% (1.2 to 3d) of a carcass cord diameter d from the crown portion C to the shoulder portion S in the present invention.

In greater detail and with reference to FIGS. 1 and 2, the regions in which the above recited preferred range of the rubber thickness (1.2 t 3d) is to be satisfied are, in the shoulder portion S, a part having a length $l_1$ within a range of 20 to 50 mm as measured from the shoulder point P toward the side of the bead portion B, and in the crown portion C, a part having a length $l_2$ of at least 50 mm inclusive as measured from the shoulder point P toward the side of the center line m. If the length $l_1$ is below 20 mm, there cannot be obtained any effect, and if it is above 50 mm on the other hand, the tire weight will become too great, though the high speed durability can be improved. At the crown portion C, on the other hand, there cannot be obtained any effect if the length $l_2$ is below 50 mm.

If the rubber thickness is below 120% of the carcass cord diameter d, there cannot be obtained any effect and if it is above 300%, on the other hand, the gaps between the cords are so great that driving stability will drop. When determining the rubber thickness in the manner described above, it is advisable to interpose a reinforcing rubber layer 5 between the upper and lower carcass layers $4u$ and $4d$ as shown in FIGS. 1 and 2.

Next, the tire of the present invention and a conventional tire were fitted to a car and then subjected to a driving test in order to compare their strength before and after driving.

(a) Tire of this invention:
tire size 225/580-13
carcass layer: two-layered structure with their carcass cords crossing one another.
aspect ratio: 0.45
rubber thickness between upper and lower
carcass cords: about 200% of carcass cord diameter
carcass cord diameter: 0.83 mm The rubber thickness was 20 mm wide from shoulder point P in the direction of bead portion B ($l_1$) and 50 mm wide from shoulder point P in the direction of center m ($l_2$) (see FIG. 2).

(b) Conventional tire:

The same as the tire of the present invention except that the rubber thickness between the upper and lower carcass cords was 50% of the carcass cord diameter and the rubber thickness was the same at the crown portion and at the shoulder portion. Actual car driving tests:

A test car was driven at 100 to 180 km/hr on a dry paved surface for about 300 km. The drop of the cord strength after the test is shown in Table 1 below (the mean values in the same circuit and in the same number of turns).

TABLE 1

|  | before driving | after driving |
|---|---|---|
| Tire of this invention: | 100 | 90 |
| Conventional tire: | 100 | 70 |

It can be understood from Table 1 that the tire of the present invention has excellent durability.

As described above, in accordance with the tire of the present invention, the rubber thickness between the upper and lower carcass cords is from 120% to 300% of the carcass cord diameter from the crown portion to the shoulder portion. Accordingly, the high speed durability of the tire can be improved drastically, and the tire of the present invention is effective as tires for racing side-cars and four-wheeled racing cars that run in a racing circuit.

We claim:

1. In a pneumatic tire for high speed driving having left and right bead portions, left and right side wall portions and a tread portion and having an aspect ratio of from 0.25 to 0.75, the improvement wherein two carcass layers comprising carcass cords embedded in a coating rubber having a 100% modulus of from 30 to 70 kg/cm$^2$ are disposed between said bead portions, said carcass cords being at an angle to the equatorial plane of the tire so that the cords of one carcass layer cross the cords of the other carcass layer, and wherein the thickness of the rubber between the cords of the carcass layers is from 120 to 300% of the diameter of the cords of one of said carcass layers in the region extending from at least 50 mm from the shoulder point in the direction toward the equatorial plane of the tire to between 20 and 50 mm from the shoulder point in the direction toward the respective bead portion.

2. A pneumatic radial tire according to claim 1, wherein said carcass layers are each formed by embedding carcass cords in a parallel arrangement in said coating rubber at a density of 20 to 65 cords per 50 mm measured at a right angle to the lengthwise direction of said cords.

3. A pneumatic radial tire according to claim 1, wherein said carcass cords are chemical fibers selected from nylon, polyester and aromatic polyamide fibers.

* * * * *